United States Patent [19]

von Stein et al.

[11] 4,080,061
[45] Mar. 21, 1978

[54] APPARATUS FOR PROCESSING DEVELOPED PHOTOGRAPHIC FILMS PRIOR TO COPYING

[75] Inventors: Werner von Stein, Hamburg; Wolfgang Zahn, Munich; Walter Knapp, Taufkirchen, all of Germany

[73] Assignee: AGFA-Gevaert, A.G., Leverkusen, Germany

[21] Appl. No.: 729,693

[22] Filed: Oct. 5, 1976

[30] Foreign Application Priority Data

Oct. 10, 1975 Germany .............................. 2545488

[51] Int. Cl.² .............................................. G03B 27/78
[52] U.S. Cl. .............................................. 355/38
[58] Field of Search .................. 355/71, 77, 68, 97, 355/41, 39, 40, 32–35, 38

[56] References Cited

U.S. PATENT DOCUMENTS

| Re. 28,046 | 6/1974 | Renold | 355/77 X |
|---|---|---|---|
| 3,094,035 | 6/1963 | Baasner | 355/68 X |
| 3,674,365 | 7/1972 | Köhler et al. | 355/40 |
| 3,829,214 | 8/1974 | Zahn et al. | 355/38 X |
| 3,898,002 | 8/1975 | Kinder et al. | 355/41 X |

Primary Examiner—Donald A. Griffin

Attorney, Agent, or Firm—Peter K. Kontler

[57] ABSTRACT

Groups of several successive film frames of an exposed and developed photographic film are examined seriatim at an inspecting station which is located ahead of an encoding station or immediately ahead of the copying station in a photographic copying machine. An attendant examines the frames of a group at the inspecting station and actuates one or more buttons on a control panel in order to produce signals which are indicative of necessary adjustment of exposure controls for copying of certain frames. The buttons are actuated subsequent to depression of selected connecting knobs which form a row along the group of frames at the inspecting station and whose mutual spacing is less than the length of a frame; this insures that at least one knob is in register with each frame of a group at the inspecting station. The depression of a knob insures that the buttons on the control panel can transmit signals to the corresponding stage of a shift register. The stored signals are advanced through successive stages of the shift register, and the last stage transmits the signals to the encoding mechanism at the encoding station or directly to the exposure controls of the copying machine, always simultaneously with arrival of the corresponding film frame at the encoding or copying station.

18 Claims, 4 Drawing Figures

APPARATUS FOR PROCESSING DEVELOPED PHOTOGRAPHIC FILMS PRIOR TO COPYING

BACKGROUND OF THE INVENTION

The present invention relates to apparatus for processing web- or strip-shaped information carriers, especially exposed and developed photographic films which are about to enter a copying machine, such as a roll copying machine. More particularly, the invention relates to improvements in apparatus for producing and transporting signals which represent data for proper reproduction of selected frames of photographic films, i.e., data which must be considered during the making of reproductions to account for certain peculiarities of the corresponding film frames. Such peculiarities can include an unusual ratio or distribution of colors and/or density.

Before the frames of an exposed and developed photographic film enter the copying station, they are usually examined by an experienced attendant at an inspecting station which precedes the copying station. The attendant examines several film frames at a time and transmits information to the associated signal storing unit or units when the nature of one or more frames at the inspecting station is such that the automatically determined or selected exposure values for such frames must be corrected in order to insure the making of satisfactory reproductions. The thus stored information is transmitted to the exposure controls of the copying machine in synchronism with movement of the corresponding film frames to the copying station.

Presently known inspecting stations for groups of exposed and developed film frames are designed to receive a predetermined number of film frames at a time. Each frame is assumed to have a given length, and the width of all frame lines between neighboring film frames is assumed to be identical. If such requirement is satisfied, each of a predetermined number of film frames at the inspecting station assumes a preselected position, e.g., a position of alinement with the corresponding signal storing unit. The attendant examines the frames which dwell at the inspecting station and transmits appropriate signals to the corresponding storing unit or units if the nature of one or more film frames warrants a correction of the exposure, i.e., if the exposure of one or more frames should be made in a manner which is different from the exposure selected by the automatic scanning system for successive frames of a developed film. In many instances, suitable indicia (e.g., notches, performations, dark spots or other automatically detectable information) are applied directly to the corresponding film frames. The applied indicia are read when the corresponding frames reach or approach the copying station and the exposure controls of the copying machine are adjusted accordingly.

The just discussed apparatus will operate reliably only if the length of each film frame is the same and if the width of all frame lines is also the same. This is not the case in connection with the majority of exposed films which are delivered or sent to a processing laboratory, either by dealers or directly by customers. For example, photographic films which are used in many types of cameras and have a frame size of 24 × 36 millimeters often expose the film in such a way that, though the size of each frame (24 × 36 mm) is the same, the width of frame lines varies considerably, often from frame to frame. In fact, the deviation of the combined width of all frame lines from a desired or anticipated width frequently equals or exceeds the length of a film frame, even if the film is relatively short (e.g., even if the film can be exposed with 12 or 20 frames). The reasons for deviation of the width of frame lines from a standard width are numerous, e.g., improper manipulation of the film transporting mechanism, excessive tolerances in mounting of component parts of the film transporting mechanism and/or progressing wear upon the film transporting mechanism. As a rule, the width of film frames will deviate considerably from a standard width if the film was exposed in an inexpensive camera and if the number of frames is relatively high (e.g., 36).

It follows that presently known apparatus are not suited for automatic delivery of successive groups of film frames to the inspecting station because the number of frames which are located within the confines of the inspecting station will vary if the width of frame lines deviates from a preselected value. Moreover, the film frames which are located at the inspecting station are not in proper alinement with the respective signal storing units or with the sections of a single signal storing unit.

OBJECTS AND SUMMARY OF THE INVENTION

An object of the invention is to provide a novel and improved apparatus which can properly identify portions (e.g., film frames) of web- or strip-shaped carriers of information even if the spacing between neighboring portions is not uniform.

Another object of the invention is to provide an apparatus which can be used for storage and proper transport of data pertaining to selected frames of an exposed and developed photographic film even if the width of frame lines between neighboring frames varies within a wide range.

A further object of the invention is to provide an apparatus which can be used with advantage in photographic or other types of copying machines for identification of selected originals which constitute portions of an elongated web and which are to be reproduced at the copying station, either on the basis of information which has been obtained as a result of automatic scanning of successive originals or on the basis of additional information which is produced, stored and advanced upon visual inspection of the originals.

An additional object of the invention is to provide the apparatus with a novel system for storing and advancing information to insure proper reproduction of a series of interconnected originals which may but need not be equally spaced from each other.

The invention is embodied in an apparatus for producing and transporting signals representing data for proper reproduction of portions of an elongated web-like carrier of information (e.g., discrete frames of an exposed and developed photographic roll film wherein the frames have identical lengths) in a copying machine, e.g., a roll copying machine. The apparatus comprises means (e.g., at least one electric motor which drives a film-engaging roller) for transporting the carrier along a predetermined path including a first section (which is adjacent to an inspecting station) and a second section (which can be adjacent to an encoding station or a copying station), the first section being long enough to receive a group of carrier portions (e.g., five film frames regardless of the width of frame lines between such frames) at a time so that an entire group of carrier portions can be visually inspected in the first section, signal producing means (e.g., a set of discrete buttons or analogous signal producing components on a control panel) in the region of the first section, signal storing means having a plurality of signal storing units (such signal storing means may comprise a shift register having a series of stages each of which constitutes a signal storing unit), a plurality of spaced apart connecting elements (e.g., equally spaced knobs which form a row extending in parallelism with the first section of the path for the carrier), one for each signal storing unit, the spacing of neighboring connecting elements being less than the length of a carrier portion so that at least one connecting element invariably registers with each carrier portion of a group in the first section and the connecting elements being operable (e.g., depressible) to connect the signal producing means with the respective signal storing units so that, upon operation of a selected connecting element, the actuation of one or more components of the signal producing means by a person inspecting the group of carrier portions in the first section results in the transmission of appropriate signals pertaining to the carrier portion in register with the selected connecting element to the corresponding signal storing unit, signal evaluating means adjacent to the second section of the path for the carrier (such evaluating means may constitute an encoding device which applies indicia to the carrier portions or the exposure controls of the copying machine), and means (e.g., additional stage or stages of the shift register and/or a pulse shaper which receives pulses from a signal generator actuated by the moving carrier) for advancing signals from the signal storing units to the evaluating means in synchronism with movement of the corresponding carrier portions into the second section of the path for the carrier, i.e., into a position of register with the evaluating means.

Each connecting element is disposed at a different distance from the evaluating means and the distances through which stored signals are advanced from the respective signal storing units to the evaluating means equal or approximate the distances between the evaluating means and the corresponding connecting elements.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
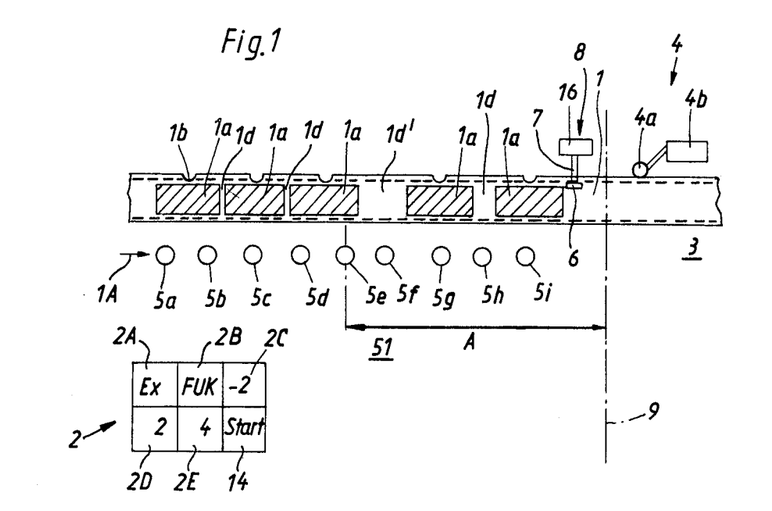
FIG. 1 is a schematic plan view of certain components of an apparatus which embodies one form of the invention.

Referring to FIG. 1, there is shown an elongated web-like carrier of information which constitutes an exposed and developed photographic roll film 1 having a row of frames 1a of identical length. The frames 1a are separated from each other by frame lines 1d having different widths. For example, the width of the two leftmost frame lines 1d is the same or nearly identical but the width of the rightmost frame line 1d is several times the width of the leftmost frame line and a relatively small fraction of the width of the frame line 1d'. One marginal portion of the film 1 is provided with markers in the form of notches 1b, one for each frame 1a, and each marker 1b is located exactly or almost exactly midway between the ends of the adjacent film frame. The markers 1b are formed in the film 1 subsequent to exposure and development, and their primary function is to allow for proper positioning of respective frames 1a at the copying station.

The inspecting station 51 of the apparatus which is shown in FIG. 1 is adjacent to a first section of the film path, namely to the left of a reference line 9 (indicated by phantom lines), and the inspecting station is long enough to accommodate a group of five successive film frames 1a irrespective of the (anticipated maximum) width of frame lines 1d between such frames. It is assumed that the maximum width of a frame line 1d will not exceed the length of a film frame 1a. The frames 1a at the inspecting station 51 are preferably located above the light-transmitting cover of a light box to facilitate visual inspection by an attendant who is experienced enough to be capable of determining whether or not the copying of a particular frame necessitates an adjustment of the exposure controls, i.e., an adjustment other than that which has been selected for the particular frame by the automatic monitoring system of the copying machine. The inspecting station 51 accommodates or is adjacent to a control panel 2 which has several pushbuttons or analogous manually operable signal producing components including a "Start" button 14 for a motor 10 (shown in FIG. 2), and "Ex" button 2A for the so-called exprints, a "FUK" button 2B for color correction, and buttons 2C, 2D, 2E bearing the characters "−2", "2" and "4" which represent density correction values. When the attendant depresses the "Start" button 14 on the control panel 2, the film 1 is transported lengthwise (in a direction to the right, as viewed in FIG. 1) so as to place the next group of five film frames 1a into an optimum position for examination at the inspecting station 51, i.e., into the first section of the film path. At the same time, the preceding group of five film frames 1a is transported beyond the reference line 9, into a second section of the film path, namely, either directly to the copying station or to an encoding station 3 where the selected film frames 1a are provided with indicia whose configuration, size and/or positioning depends upon the desired nature of exposure, i.e., whether the attendant has depressed one or more buttons 2A-2E, 14 on the control panel 2 for adjustment of the exposure controls during reproduction of images of the selected film frames. As will be explained in connection with FIG. 2, the film 1 can be transported continuously (if the five film frames 1a at the station 51 can be copied without any special adjustment of exposure controls in the copying machine) or stepwise if the attendant has decided that one or more film frames of the group at the inspecting station 51 must be copied in a manner different from that which is selected by the automatic scanning system.

The station 3 is called an encoding station because the apparatus of FIG. 1 is assumed to be provided with evaluating means 21 (FIG. 2) for encoding on selected film frames 1a indicia in the form of notches, holes, perforations or other automatically detectable data which can be decoded by a reader at the copying station. The indicia are applied in predetermined positions with respect to the corresponding markers 1b and each thereof may have a different size and/or shape so that the automatic reader will be in a position to discriminate between different bits of information. As mentioned above, the encoding station 3 can be omitted if the signals which are produced in response to actuation of buttons 2A–2E, 14 on the control panel 2 are transmitted directly to an evaluating device other than the encoding means 21, namely, to the exposure controls of the copying machine.

The apparatus further comprises a sensor 4 which monitors the adjacent marginal portion of the film 1 for the presence of markers 1b. The sensor 4 comprises a roller follower 4a which rides along the adjacent marginal portion and enters the oncoming marker 1b to thereby actuate a microswitch 4b which arrests the motor 10 (FIG. 2) of the film transporting mechanism if the corresponding frame 1a is to be provided with indicia.

The inspecting station 51 further accommodates a battery of connecting elements 5a to 5i which form a row extending in parallelism with the first section of the path for the film 1. The spacing between neighboring connecting elements 5a –5i (hereinafter called knobs for short) is identical and is less than the length of a film frame 1a so that at least one knob registers with each of a group of five frames 1a at the inspecting station 51.

The apparatus also comprises a metering or distance measuring device 8 including a roller 6 which bears against the adjacent marginal portion of and is rotated by the film 1 whenever the film is in motion. The roller 6 is mounted on a shaft 7 which drives a disk 16. The latter copperates with the light source 17 and photosensitive transducer 18 of a photoelectric cell (shown in FIG. 2) to furnish pulses at intervals which are indicative of the distances covered by the moving film 1. The device 8 is actually a simple pulse generator.

When the motor 10 has completed the transport of film 1 through a distance which is necessary to locate five fresh film frames 1a at the inspecting station 51, the attendant examines the frames and, if a particular frame is to be reproduced with one or more correction factors, the attendant first depresses the adjacent knob 5a, 5b, 5c, 5d 5e, 5f, 5g, 5h or 5i, i.e., that knob which is definitely in register with the selected frame 1a. This establishes a connection between the control panel 2 and that signal storing unit or signal storing unit section which is to receive one or more signals indicative of the desired correction or corrections for the copying of the frame in question. In the next step, the attendant depresses that button or those buttons (2A–2E) on the control panel 2 which, in his judgment, must be actuated in order to insure a satisfactory exposure of the corresponding film frame 1a. If two or more frames 1a of the group at the inspecting station 51 must be copied in a manner deviating from automatic adjustment or setting of the copying equipment, the attendant thereupon depresses one or more additional knobs and transmits to the corresponding signal storing section or sections appropriate signal(s) by depressing one or more buttons 2A–2E on the control panel 2. Whenever a knob (e.g., 5a) is depressed, the other knobs (5b–5i) are deactivated, i.e., they do not connect the control panel 2 with the respective signal storing sections. In other words, only one signal storing section is connected with the control panel at any time.

When the storing of signals is completed, i.e., when the attendant has depressed each such knob which is adjacent to a frame 1a requiring copying in a special way, the attendant depresses the button 14 on the control panel 2 to start the motor 10 which begins to transport the film 1 lengthwise so that the frames 1a move from the inspecting station 51 toward the encoding station 3. The pulse generator 8 transmits signals which are indicative of the distances covered by the moving film 1; when the number of such signals matches a number which is indicative of the fact that a film frame whose copying requires a special adjustment of the exposure controls at the copying station has reached the encoding means 21 at the station 3, the film is arrested as soon as the roller follower 4a enters the respective marker 1b, and the film remains at a standstill until the encoding of one or more indicia on the corresponding frame 1a is completed. The film 1 is then set in motion again by motor 10 in response to a signal from the encoding means 21 and continues to move, either stepwise or continuously (depending on the number of frames which form part of a group and must be copied with a special adjustment of the exposure controls) until the next group of five frames 1a reaches the inspecting station 51. The motor 10 is then arrested by a device other than the encoding means 21, namely by a shift register 20 which is shown in FIG. 2.

If the film frame 1a which registers with the knob 5e of FIG. 1 must be copied in a manner deviating from the copying of the majority of frames on a given film, the motor 10 is prepared for stoppage when the film 1 covers the distance A, i.e., the distance between the knob 5e and the reference line 9; the microswitch 4b then causes the motor 10 to arrest the film 1 as soon as the roller follower 4a enters the oncoming marker 1b (i.e., that marker which is located midway between the ends of the frame 1a which is aligned with the knob 5e of FIG. 1 during inspection of the illustrated group of five frames). The distance between the reference line 9 and the axis of the roller follower 4a equals half the length of a film frame 1a.

Figure 2:
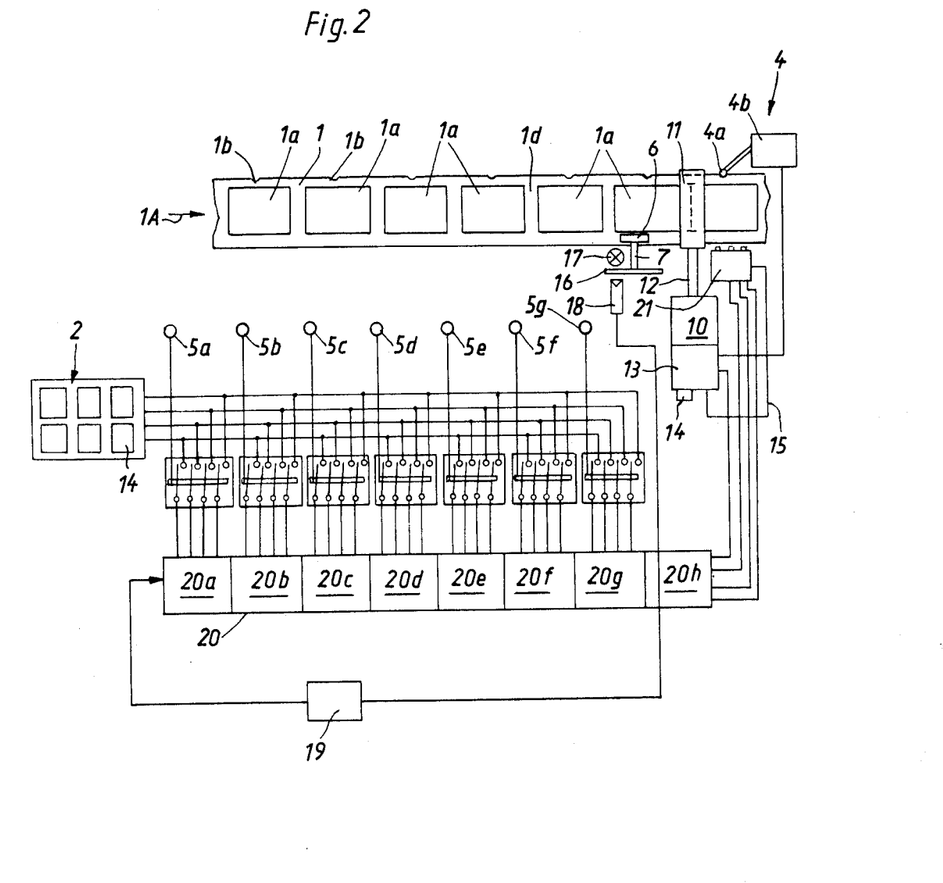
FIG. 2 is a circuit diagram of the apparatus of FIG. 1.

FIG. 2 shows certain additional parts of the apparatus of FIG. 1. For the sake of simplicity, FIG. 2 merely shows seven connecting elements or knobs 5a–5g and a portion of film 1 with seven frames 1a five of which are located at the inspecting station 51 and are substantially equally spaced from each other (i.e., the width of the frame lines 1d shown in FIG. 2 matches or deviates only slightly from a predetermined optimum width). The distance between two neighboring knobs is slightly less than the length of a frame 1a. Thus, seven knobs 5a–5g are amply sufficient to facilitate unequivocal identification of each frame 1b of a group of five frames at the inspecting station 51.

FIG. 2 further shows the motor 10 with an output shaft 12 which carries an advancing roll 11 serving to transport the film 1 lengthwise in the direction indicated by arrow 1A. The roll 11 preferably cooperates with a second roll (not shown) which is located opposite the roll 11 and is biased thereagainst so as to insure that the film 1 is invariably set in motion when the motor 10 is started and that the film remains in motion as long as the motor 10 is on.

The control circuit for the motor 10 is shown at 13; this circuit has two discrete inputs one of which is connected with the "Start" button 14 on the control panel 2 (the button 14 is shown twice in FIG. 2) and the other of which is connected to the encoding means 21 at the station 3 by conductor means 15. Thus, the motor 10 can be started by an attendant (button 14) or by the encoding means 21 when the latter completes the encoding of indicia on the adjacent frame 1a.

The motor 10 can be arrested by a suitable logic circuit, e.g., an AND-gate (not specifically shown because it forms part of the control circuit 13) having two inputs one of which is connected to the microswitch 4b and the other of which is connected with the last stage 20h of the shift register 20. The shift register 20 has a series of eight signal storing units or stages 20a to 20h. The signal storing units or stages 20a-20g are respectively associated with the knobs 5a to 5g. It will be seen that, when the attendant actuates one of the knobs 5a-–5g, the buttons 2A-2E on the control panel 2 are connected with the respective stages 20a-20g of the shift register 20. The manner in which the conncection between the buttons 2A-2E and the selected stage of the shift register 20 is established in response to depression of the respective knob is plainly shown in FIG. 2 and will be readily understood by those skilled in the art. The motor 10 is arrested only when both inputs of the AND-gate in the circuit 13 receive signals at the same time, i.e., when a signal from the last stage 20h of the shift register 20 arrives simultaneously with a signal from the microswitch 4b.

The aforementioned wheel 16 of the pulse generator 8 has an annulus of apertures moving between the light source 17 and transducer 18 of the photoelectric cell. The transducer 18 transmits a signal whenever the light beam issuing from the source 17 reaches its photosensitive surface; such signal is transmitted to a pulse shaper 19 which is connected with the stages 20a-20g of the shift register 20 and serves as a means for transmitting signals which are used to advance stored signals from stage to stage, i.e., toward the last stage 20h of the shift register 20. The pulse shaper 19 receives a pulse whenever the film 1 covers a distance corresponding to that between two neighboring knobs 5 at the inspecting station 51.

The capacity of each stage of the shift register 20 is such that the stage can store all signals which can be transmitted thereto in response to depression of the signal producing buttons 2A-2E on the control panel 2. It will be noted that the number of conductors which connect the buttons 2A-2E of the control panel 2 with the stages of the shift register 20 is less than five; this is due to the fact that the drawing is schematic.

The provision of encoding means 21 at the station 3 is preferred at this time because the operation of the improved apparatus is independent of operation of the copying machine proper. It presents no problems to equip the copying machine with an automatic reader which decodes the data applied by the encoding means 21 and adjusts the exposure controls accordingly when the corresponding film frame 1a reaches the copying station.

The operations of the apparatus of FIGS. 1 and 2 is as follows:

It is assumed that a group of five film frames 1a is located at the inspecting station 51. The attendant in charge inspects the frames 1a and determines whether or not one or more frames must be copied with a special setting of exposure controls at the copying station. If such is the case, the attendant first depresses that knob (e.g., the knob 5e of FIG. 1) which is in register with the corresponding film frame 1a, and the attendant thereupon depresses one or more buttons 2A-2E, depending on the desired nature of adjustment of the exposure controls. The pertinent signal or signals are stored in the associated stage 20e of the shift register 20; the stage 20e is then connected with the control panel 2 as a result of depression of the knob 5e. The attendant thereupon depresses the "Start" button 14 so that the circuit of the motor 10 is completed and the roll 11 transports the film 1 in the direction indicated by the arrow 1A. The moving film 1 rotates the wheel 6 so that the pulse generator 8 transmits pulses to the pulse shaper 19 at a frequency corresponding to the intervals of time required by the wheel 11 to advance the film 1 by distances corresponding to that between two neighboring connecting elements or knobs at the inspecting station 51. Signals from the pulse shaper 19 are used to advance signals from stage to stage of the shift register 20. The motor 10 remains on until the last stage 20h of the shift register 20 receives one or more signals which were generated in response to depression of one or more buttons 2A-2E on the control panel 2. The AND-gate of the control circuit 13 then arrests the motor 10 as soon as the roller follower 4a enters the oncoming marker 1b (this is the marker associated with the frame 1a which was in register with the knob 5e at the inspecting station 51). The signal from the last stage 20h of the shift register 20 reaches the corresponding input of the AND-gate in the control circuit 13 not later than when the respective marker 1b reaches the roller follower 4a; this insures that the motor 10 can be arrested practically instantaneously, i.e., the film 1 is in an optimum position for the encoding of appropriate indicia in the film frame 1a which is in register with the encoding means 21. The microswitch 4b is "prepared" for immediate stoppage of the motor 10 due to the fact that the reference line 9 is shifted relative to the axis of the roller follower 4a by a distance which equals half the length of a film frame 1a. When the motor 10 is at a standstill, the encoding means 21 provides the adjacent frame 1a with suitable indicia, i.e., with those indicia which are represented by signals transmitted by the last stage 20h of the shaft register 20 at the time the motor 10 comes to a halt. When the encoding of indicia is completed, the conductor 15 transmits a signal to the corresponding input of the control circuit 13, i.e., the motor 10 is started again and the film 1 remains in motion until the last stage 20h of the shift register 20 again receives one or more signals or until a fresh group of five frames 1a reaches the inspecting station 51. The means for arresting the motor 10 when the inspecting station 51 has received a group of fresh film frames 1a includes the pulse generator 8 and the pulse shaper 19; the latter causes the last stage 20h of the shift register 20 to transmit to the circuit 13 an arresting signal when the extent of lengthwise movement of the film 1 is sufficient to make sure that the inspecting station 51 has received five fresh film frames 1a. The operator thereupon examines the newly arrived film frames 1a at the station 51 and actuates one or more connecting elements or knobs and one or more signal producing buttons on the control panel 2, depending on the number of film frames 1a (if any) whose copying must be carried out with special adjustment of the exposure controls, i.e., with an adjustment which is superimposed upon the adjustment selected by the automatic frame inspecting means of the copying machine.

Figure 3:
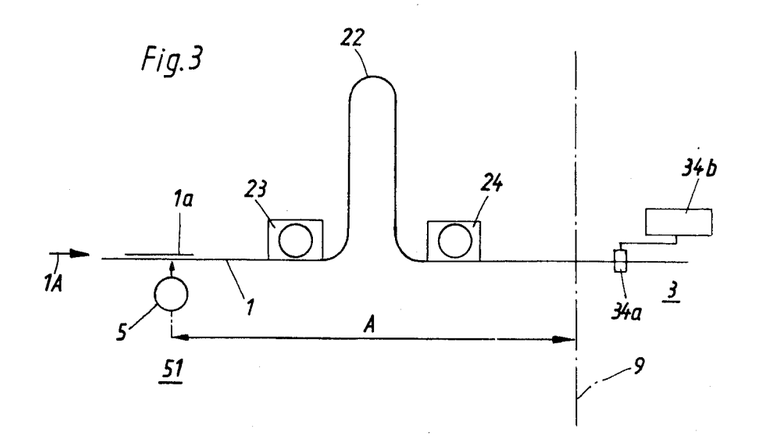
FIG. 3 is a schematic side elevational view of a second apparatus.

The apparatus of FIGS. 1 and 2 has been found to operate quite satisfactorily, even if the width of frame lines 1d varies within a very wide range. The intervals of idleness are surprisingly short, i.e., an attendant can inspect a large number of filmframes 1a per unit of time in spite of the fact that the motor 10 is operated intermittently, not only because it comes to a halt whenever a fresh group of film frames arrives at the inspecting station 51 but also because it comes to a halt whenever a frame 1a which necessitates encoding moves into register with the encoding means 21. The periods of idleness of the film transporting means 10-12 can be reduced still further, with attendant increase of the number of film frames which can be inspected per unit of time, if the apparatus of FIGS. 1 and 2 is modified in a manner as shown schematically in FIG. 3. FIG. 3 shows certain elements of an apparatus which can store a certain length of the film 1 between the inspecting and encoding stations so that the stored length of the film is processed in the region located to the right of the reference line 9 while an attendant inspects a fresh group of film frames 1a at the station 51. In other words, delays due to stoppage of the film for the purpose of encoding information on certain film frames are eliminated.

Referring more specifically to FIG. 3, the stored portion of the film 1 forms a loop 22 which may be longer or shorter than shown in the drawing. For example, the length of the loop 22 may equal or approximate the combined length of one or two groups of film frames 1a plus the corresponding frame lines. The apparatus of FIG. 3 comprises two pulse generators 23, 24 which are respectively located ahead of and behind the loop 22, as considered in the direction (arrow 1A) of lengthwise movement of the film 1. The pulse generator 24 may be identical with the pulse generator 8 of FIGS. 1 and 2. The transmission of signals from the buttons 2A-2E on the control panel 2 (see FIG. 4 which illustrates several details of the apparatus of FIG. 3) to the corresponding signal storing units or stages of the shift register 20' is the same as described in connection with FIG. 2. When an attendant completes the feeding of information to one or more stages of the shift register 20' (depending on the number of film frames which must be copied with a modified setting of the exposure controls), the "Start" button 14 is depressed to transport the inspected frames 1a into the space between the pulse generators 23 and 24. At the same time, the encoding means 21 at the station 3 applies indicia to selected frames 1a so that the length of the loop 22 fluctuates as s result of intermittent introduction of groups of five frames 1a each into the space between the pulse generators 23, 24 and intermittent withdrawal of film from such space by a second film transporting unit including a motor 32 shown in FIG. 4. Of course, the formation of loop 22 contributes somewhat to complexity of the components which must insure that indicia are applied to proper frames 1a, i.e., that the encoding means 21 receives proper information for the encoding of indicia in the adjacent frame 1a in spite of the fact that the film 1 is not taut. In other words, it is not sufficient to merely determine the distance (A) between that knob 5 which has been depressed prior to actuation of one or more buttons 2A-2E on the control panel 2 and the reference line 9 before the motor 32 is arrested in order to place the foremost frame 1a which requires encoding into register with the means 21. It is further necessary to consider the length of the loop 22, i.e., the difference between the actual length of the film between a selected knob 5 at the station 51 and the encoding means 21 and the minimum distance between the same knob and the means 21. Otherwise stated, it is necessary to consider the distance A plus the length of the loop 22. The length of the loop 22 can be determined by appropriate processing of signals which are furnished by the pulse generators 23 and 24. This, of course, is based on the premise that the length of the loop 22 is zero when the film portion between the pulse generators 23 and 24 is straight.

The possibility or likelihood that two knobs will register with one and the same film frame 1a at the inspecting station 51 (see the knobs 5d and 5e in FIG. 1) is of no consequence since each such knob can properly select a stage (20d or 20e) of the shift register 20 for the corresponding film frame 1a at the station 51. This does not alter the fact that the last stage 20h of the shift register 20 transmits appropriate information to the encoding means 21 when the latter is in register with the corresponding film frame 1a (namely, with that frame 1a which registers with the knobs 5d and 5e of FIG. 1).

Figure 4:
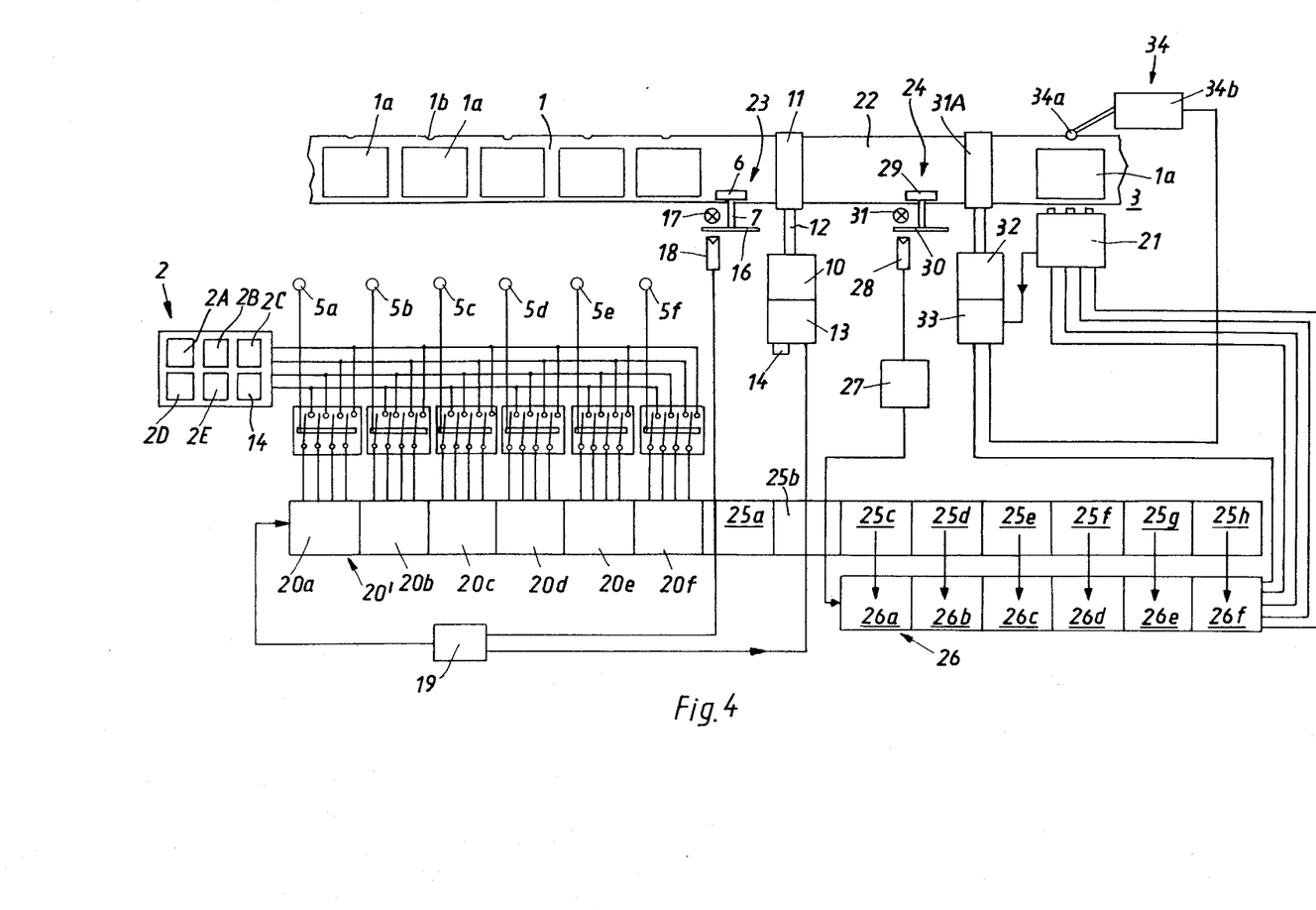
FIG. 4 is a circuit diagram of the second apparatus.

Referring to FIG. 4, signals which are transmitted by the pulse shaper 19 serve the same purpose as described in connection with FIG. 2 (i.e., to advance signals from stage to stage of the shift register 20') plus the function of arresting the motor 10 when a freshly inspected group of frames 1a has entered the space between the pulse generators 23 and 24. Furthermore, the sole means for starting the motor 10 is the button 14 on the control panel 2. The shift register 20' includes a first set or series of stages 20a to 20f which can receive signals from the control panel 2 in response to depression of associated knobs 5a to 5f, plus a second set or series of stages 25a or 25h. The advancement of signals from preceding to the next-following stages of the shift register 20' takes place in response to signals from the pulse shaper 19, the same as in the apparatus of FIG. 2.

The last six stages 25c to 25h of the shift register 20' are connected in parallel with the corresponding stages 26a to 26f of a second shift register 26 the last stage (26f) of which transmits signals to the encoding means 21 at the station 3. The electrical connection between the shift registers 20' and 26 is such that information which is stored in the stages 25c-25h can be transmitted simultaneously to the associated stages 26a to 26f. The means for effecting the advancement of signals from stage to stage of the shift register 26 includes a second pulse shaper 27 whose input is connected to the transducer 28 of a photoelectric cell which further includes a light source 31 and forms part of the pulse generator 24. The pulse generator 24 has an apertured wheel 30 driven by a roller 29 which is rotated by the film 1. The parts 6-7 and 16-18 of FIG. 4 form part of the pulse generator 23. The encoding means 21 of FIG. 4 is preferably identical with the encoding means of FIG. 2, i.e., it comprises means for applying indicia in the form of notches, holes, perforations, slits, triangular cutouts or the like.

The motor 32 has an output shaft which is directly connected with an advancing roll 31A for the film 1; the advancing roll 31A moves the film 1 lengthwise in a direction to draw the film from the space between the pulse generators 23, 24 and to transport the film until the control circuit 33 for the motor 32 receives a signal which is processed to arrest the motor 32 because a selected frame 1a has arrived at the encoding station 3, i.e., into a position of alinement with the encoding means 21. The encoding station 3 further accommodates a roller follower 34a which tracks the adjacent marginal portion of the film 1 and penetrates into an oncoming marker 1b to thereby cause the associated microswitch 34b to transmit a signal to the corresponding input of the AND-gate in the control circuit 33 for the motor 32. The output of the AND-gate of the control circuit 33 transmits a signal which arrests the motor 32 when its other input receives a signal from the last stage 26f of the shift register 26 simultaneously with a signal from the microswitch 34b. This takes place when the other output or outputs of the stage 26f transmit one or more signals to the encoding means 21, i.e., when the latter is in register with a frame 1a which is to be provided with encoded information to be scanned by the automatic reader of the copying machine for appropriate adjustment of the exposure controls.

The advancing rolls 11 and 31A respectively engage the film 1 upstream and downstream of the loop 22 and the wheels 6, 29 of the pulse generators 23, 24 respectively engage the film 1 upstream of the advancing rolls 11 and 31A. The loop 22 is formed because the two devices 10–12 and 31A–32 of the transporting means for the film 1 are operated at different intervals, at different speeds and/or for different periods of time. The pulse generator 23 furnishes a pulse whenever the roll 11 advances the film through a distance which equals the distance between two neighboring knobs at the inspecting station 51 (i.e., when the film 1 is advanced in a direction to increase the size of the loop 22), and the pulse generator 24 furnishes a pulse whenever the roll 31A advances the film 1 through the same distance but in a direction to reduce the size of the loop 22. The periods of advancement of signals from the stages 20a–20f to the encoding means 21 depend on the differences between the film lengths which are added to and removed from the loop 22.

The total number of stages (20a–20f plus 25a–25h) in the shift register 20' is 2n plus m wherein n is the number of knobs 5a–5f at the inspecting station 51 and m is the quotient of the minimum length of the loops 22 and the distance between two neighboring knobs. In the embodiment of FIGS. 3 and 4, n equals six and m equals two.

The operation of the apparatus which is shown in FIGS. 3 and 4 is as follows:

The feeding of information to the stages 20a to 20f of the shift register 20' (in response to depression of selected connecting elements or knobs 5a–5f and subsequent depression of one or more signal producing buttons 2A–2E on the control panel 2) is the same as described in connection with FIGS. 1 and 2. The attendant thereupon depresses the button 14 to start the motor 10 which transports the freshly inspected group of five frames 1a into storage, i.e., into the space between the pulse generators 23 and 24. The motor 10 is arrested as soon as the inspecting station 51 receives a fresh group of five film frames 1a. The means for arresting the motor 10 at such time includes the pulse generator 23 and the pulse shaper 19 one output of which is connected to the corresponding "stop" input of the control circuit 13 for the motor 10.

Simultaneously with the introduction of a fresh group of five frames 1a into the inspecting station 51, the pulse shaper 19 has transmitted six signals to the shift register 20', i.e., the information (if any) which was stored in the stages 20a to 20f has been advanced six times and is stored in the stages 25a to 25f. In order to shift the information from the stages 25a, 25b to the stages 25g, 25h of the shift register 20', the pulse shaper 19 must transmit six additional signals, i.e., the film 1 must advance through a distance which equals 6d wherein d is the distance between two neighboring knobs (e.g., 5a and 5b) at the inspecting station 51. This takes place in the course of the next operation of the motor 10. The distance d equals one-half the minimum length of the loop 22, i.e., half the shortest distance between the pulse generators 23 and 24. Still further, 2d is one-half of the shortest distance between the line of contact of advancing roll 11 with the film 1 and the line of contact of film 1 with the periphery of the advancing roll 31A.

When the information which has been supplied to the stages 20a–20f of the shift register 20' reaches the stages 25c to 25h, i.e., during the next-following transfer of a group of five frames 1a into storage, the stages 25c to 25h transmit information to the stages 26a to 26f of the second shift register 26. Since the number of knobs 5a to 5f at the inspecting station 51 exceeds the number (five) of film frames which form a group, the stages 25g and 25h are invariably free of stored information prior to the next-following transfer of five film frames into storage because the transport of a group of five film frames 1a into storage between the pulse generators 23 and 24 results in the transmission of only six signals from the pulse shaper 19. In other words, the foremost information is stored in the stage 25f whenever the motor 10 completes the transport of a group of freshly inspected film frames 1a into storage. This is due to the provision of stages 25a and 25b in addition to the stages 20a–20f and 25c–25h of the shift register 20'. Of course, the stage 25f will store information only if the attendant has determined that the foremost frame 1a of that group which has been transferred into storage required copying with a modified adjustment of the exposure controls. Analogously, the stage 25a or 25b will store information only if the attendant has found that the rearmost or next-to-the-rearmost frame 1a of a group of five frames at the station 51 requires copying with a special setting of exposure controls at the copying station.

The encoding of information on frames 1a which are stored between the pulse generators 23 and 24 can begin while the motor 10 is still in motion. The motor 32 is started automatically by the encoding means 21 whenever the latter completes the encoding of information on the adjacent frame 1a. The transport of frames 1a through the station 3 takes place simultaneously with the transport of signals between successive stages of the shift register 26 (by signals transmitted by the pulse shaper 27). When the signals have been transmitted beyond the stage 26f, the length of the loop 22 is reduced to a minimum value and the loop can be enlarged again by starting the motor 10.

The function of the monitoring means 34 including the roller follower 34a and microswitch 34b is analogous to that of the monitoring means 4 shown in FIGS. 1 and 2.

It is clear that the stages 25c–25h of the shift register 20' of FIG. 4 should transmit information to the corresponding stages 26a to 26f of the shift register 26 only after the shift register 26 has been relieved of the previously supplied information. Earlier transfer of information into the stages of the shift register 26 would result in loss of previously transmitted information and improper copying of film frames.

The shift registers 20, 20' and 26 constitute but one of various suitable means for storing information which is furnished in response to depression of selected signal producing buttons 2A–2E on the control panel 2. For example, such electronic storing means can be replaced by other reversible storing means including an endless loop of magnetic tape, a disk-shaped magnetic storing device or an optical signal storing device from which the information can be erased when necessary. Such optical signal storing device may include a transparent strip made of synthetic plastic material which is colored during storing of information and from which the coloring matter is erased when the information has been evaluated by the encoding means.

The length of the inspecting station 51 can be varied within a wide range, i.e., this station can accommodate more or fewer than five film frames 1a at a time. The number of film frames in a group depends on the ability of a skilled attendant to inspect, at a glance, all of the frames at the station 51.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. Apparatus for producing and transporting signals representing data for proper reproduction of portions of an elongated web-like carrier of information in a copying machine, said carrier portions being of equal length, comprising means for intermittently transporting the carrier along a predetermined path including a first and a second section, said first section having a length sufficient to receive a group of several carrier portions at a time and said transporting means being operative to advance successive groups of carrier portions into said first section so that all carrier portions of an entire group can be visually inspected in said first section at the same time; signal producing means in the region of said first section; signal storing means having a plurality of signal storing units; a plurality of spaced-apart connecting elements adjacent to said first section, one for each of said units, the mutual spacing of said elements being less than the length of a carrier portion so that at least one connecting element registers with each carrier portion of a group in said first section, said elements being operable to connect said signal producing means with the respective units so that, upon operation of a selected connecting elements, the actuation of said signal producing means by a person inspecting the group of carrier portions in said first section results in transmission of one or more signals pertaining to the carrier portion in register with said selected element to the corresponding unit; signal evaluating means adjacent to said second section; and means for advancing signals from said units to said evaluating means in synchronism with movement of the corresponding carrier portions into said second section of said path.

2. Apparatus as defined in claim 1, wherein said connecting elements are equally spaced from each other and said signal producing means comprises a single set of signal producing components.

3. Apparatus as defined in claim 1, wherein each of said connecting elements is disposed at a different distance from said evaluating means and the distances through which stored signals are advanced from the respective units to said evaluting means equal or approximate the distances between said evaluating means and the corresponding connecting elements.

4. Apparatus as defined in claim 1, wherein said advancing means comprises a pulse generator having means for monitoring the movement of said carrier along said path and for producing pulses in response to transport of the carrier through predetermined distances, and pulse shaper means connected between said pulse generator and said signal storing means.

5. Apparatus as defined in claim 4, wherein each of said distances equals the distance between two neighboring connecting elements.

6. Apparatus as defined in claim 4, wherein said signal storing means includes shift register means having stages which constitute said signal storing units.

7. Apparatus as defined in claim 1, wherein said transporting means comprises a motor and first and second starting means for said motor, said first starting means being actuatable by hand in the region of said first section of said path and said second starting means forming part of said evaluating means.

8. Apparatus as defined in claim 7, further comprising means for arresting said motor, including a control circuit having a first input connected with said signal storing means and a second input, and means for monitoring said carrier for the presence of successive carrier portions in said second section of said path, said monitoring means being connected with said second input.

9. Apparatus as defined in claim 8, wherein each of said carrier portions is provided with a marker and said monitoring means includes means for scanning said carrier portions for the presence of such markers.

10. Apparatus as defined in claim 9, wherein said carrier is an exposed and developed photographic film and said portions thereof are discrete film frames, each of said markers constituting a notch in the respective film frame.

11. Apparatus as defined in claim 1, wherein said transporting means includes first and second transporting devices which respectively engage the carrier in said first and second sections of said path and means for operating said devices at different intervals, at different speeds and/or for different periods of time so that the carrier forms a loop intermediate said transporting devices.

12. Apparatus as defined in claim 11, wherein said advancing means comprises first and second pulse generators respectively located upstream and downstream of said loop and respectively having means for producing a first and a second pulse whenever the carrier is transported through a predetermined distance to respectively increase and reduce the size of said loop.

13. Apparatus as defined in claim 12, wherein said first and second pulse generators are respectively located ahead of said first and second transporting devices.

14. Apparatus as defined in claim 13, wherein said signal storing means comprises a first shift register having a first series of stages which constitute said units and a second series of stages, the total number of said stages being at least $2n$ wherein $n$ is the number of said connecting elements, said advancing means further including a second shift register having at least $n$ stages each connected in parallel with a stage of said second series and including a last stage connected with said evaluating means.

15. Apparatus as defined in claim 14, wherein said advancing means further comprises a first pulse shaper connected between said first pulse generator and said first shift register to advance signals from stage to stage of said first register in response to each pulse from said first pulse generator and a second pulse shaper connected between said second pulse generator and said second shift register to advance signals from stage to stage of said second register in response to each pulse from said second pulse generator.

16. Apparatus as defined in claim 14, wherein the overall number of stages in said first shift register exceeds $2n$ by the quotient of the minimum length of said loop and the distance between two neighboring connecting elements.

17. Apparatus as defined in claim 16, wherein the stages of said second shift register are connected in parallel with the last additional stages of said first shift register.

18. Apparatus as defined in claim 12, further comprising means for determining the periods of advancement of signals from said units to said evaluating means on the basis of differences between carrier lengths which are added to and carrier lengths which are removed from said loop.

* * * * *